(12) United States Patent
Watanabe et al.

(10) Patent No.: US 11,518,451 B2
(45) Date of Patent: Dec. 6, 2022

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 161 days.

(21) Appl. No.: 17/002,061

(22) Filed: Aug. 25, 2020

(65) Prior Publication Data
US 2021/0094633 A1    Apr. 1, 2021

(30) Foreign Application Priority Data

Sep. 30, 2019    (JP) .............................. JP2019-178525

(51) Int. Cl.
*B62D 37/02*    (2006.01)
*B62D 25/10*    (2006.01)
*F15D 1/00*    (2006.01)

(52) U.S. Cl.
CPC ........... *B62D 37/02* (2013.01); *B62D 25/105* (2013.01); *F15D 1/0075* (2013.01)

(58) Field of Classification Search
CPC ...... B62D 25/105; B62D 37/02; F15D 1/0075
See application file for complete search history.

(56) References Cited

U.S. PATENT DOCUMENTS

| | | | |
|---|---|---|---|
| 10,495,121 B2* | 12/2019 | Smullin | ................... G01P 5/02 |
| 2012/0152198 A1 | 6/2012 | Kim et al. | |
| 2019/0193843 A1* | 6/2019 | Kikuchi | ................... B64C 9/18 |

FOREIGN PATENT DOCUMENTS

| | | |
|---|---|---|
| JP | 2004-345562 A | 12/2004 |
| WO | 2011/024736 A1 | 3/2011 |

* cited by examiner

*Primary Examiner* — D Glenn Dayoan
*Assistant Examiner* — Melissa Ann Bonifazi
(74) *Attorney, Agent, or Firm* — Troutman Pepper Hamilton Sanders LLP

(57) ABSTRACT

An airflow adjusting apparatus includes two or more airflow generators and a controller. The airflow generators are arranged in first and second directions along a surface of an object. The airflow generators are configured to generate respective airflows in parallel directions parallel along the surface of the object. The second direction intersects with the first direction. The controller is configured to control outputs from the respective airflow generators independently of each other. The controller is configured to cause a total output from the airflow generators in a first group to be greater than a total output of the airflow generators in a second group. The airflow generators in the first and the second groups are arranged side by side in an airflow generation direction. The airflow generators in the second group are adjacent to those in the first group.

4 Claims, 8 Drawing Sheets

AIRFLOW ADJUSTING APPARATUS

CROSS-REFERENCE TO RELATED APPLICATIONS

The present application claims priority from Japanese Patent Application No. 2019-178525 filed on Sep. 30, 2019, the entire contents of which are hereby incorporated by reference.

BACKGROUND

The technology relates to an airflow adjusting apparatus that adjusts an airflow generated around a vehicle body of a traveling vehicle.

Traveling wind may be generated against a vehicle such as an automobile while the vehicle is traveling. Such traveling wind can cause air resistance or drag on the vehicle. The traveling wind can cause a turbulent flow accompanied by a vortex flow around a vehicle body, thereby increasing the air resistance and deteriorating aerodynamic noise (i.e., so-called wind noise) and aerodynamic vibration. International Publication WO2011/024736A1 discloses a vehicle airflow adjusting apparatus including a plasma actuator that is attached to a surface of a vehicle body. The plasma actuator includes two or more electrodes that are disposed with a dielectric interposed in between. The plasma actuator uses plasma generated upon application of a high voltage to the electrodes to induce an airflow. Such an airflow may be sometimes referred to as ion wind or an induced airflow.

SUMMARY

An aspect of the technology provides an airflow adjusting apparatus that includes two or more airflow generators and a controller. The airflow generators are arranged in a first direction and a second direction along a surface of an object. The airflow generators are configured to generate respective airflows in directions parallel to each other along the surface of the object. The second direction intersects with the first direction. The controller is configured to control outputs from the respective airflow generators independently of each other. The controller is configured to cause a total output from the airflow generators in a first group of the two or more airflow generators to be greater than a total output of the airflow generators in a second group of the two or more airflow generators. The airflow generators in the first group are arranged side by side in an airflow generation direction. The airflow generators in the second group are arranged side by side in the airflow generation direction and are adjacent to the airflow generators in the first group. The airflow generation direction is a direction in which the airflows are generated.

An aspect of the technology provides an airflow adjusting apparatus that includes two or more airflow generators and a controller. The airflow generators are arranged in a grid pattern or in a zigzag pattern along a surface of an object. The airflow generators are configured to generate respective airflows in directions parallel to each other along the surface of the object. The controller is configured to control outputs from the airflow generators on a group basis. The group includes the airflow generators arranged side by side in an airflow generation direction. The controller is configured to cause a total output from the airflow generators in a first group to be greater than a total output from the airflow generators in a second group. The second group is adjacent to the first group. The airflow generation direction is a direction in which the airflows are generated.

An aspect of the technology provides an airflow adjusting apparatus for a vehicle. The airflow adjusting apparatus includes two or more plasma actuators and a controller. The plasma actuators are arranged in a grid pattern or in a zigzag pattern along a vehicle body surface of the vehicle. The plasma actuators are configured to induce respective airflows in directions parallel to each other along the vehicle body surface. The controller is configured to control outputs from the plasma actuators on a group basis. The group includes the plasma actuators arranged side by side in a direction in which the airflows are induced. The controller includes circuitry. The circuitry is configured to generate a control instruction for the plasma actuators. The control instruction causes a total output from the plasma actuators in a first group to be greater than a total output from the plasma actuators in a second group. The second group is closer to a center of the vehicle in a vehicle widthwise direction than the first group.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
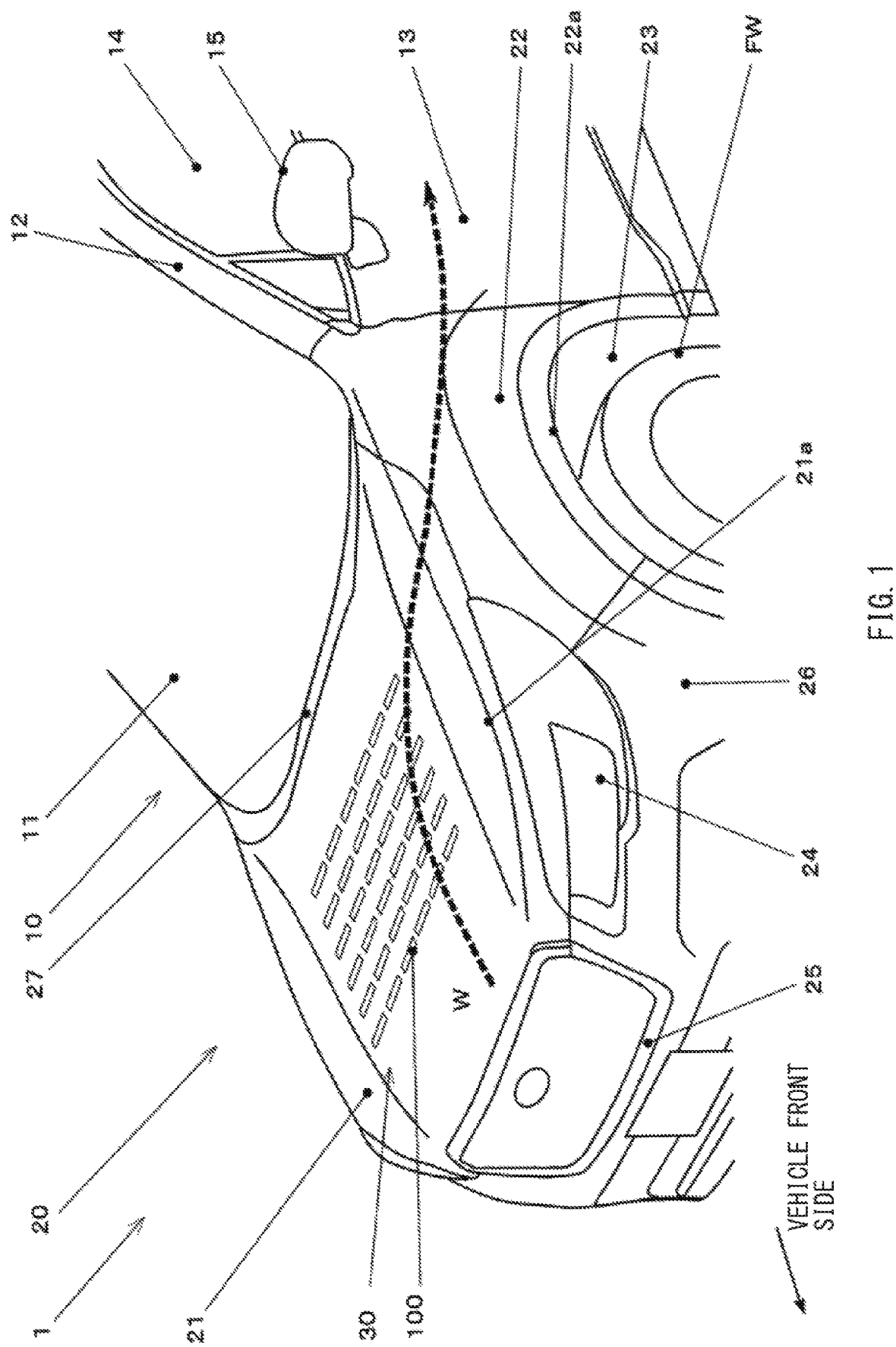
FIG. 1 is an external perspective view of an example of a front portion of a vehicle that includes an airflow adjusting apparatus according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

FIG. 1 is an external perspective view of a front portion of a vehicle that includes an airflow adjusting apparatus according to a first example embodiment of the technology. The airflow adjusting apparatus according to the first example embodiment may be provided in a vehicle such as a passenger car, for example. The airflow adjusting apparatus may adjust an airflow that is generated around a vehicle body of the traveling vehicle and relative to the vehicle. In the first example embodiment, the airflow adjusting apparatus may use a later-described plasma actuator 100 to generate an airflow and thereby guide the airflow around the vehicle body toward a desired direction. The airflow adjusting apparatus in the first example embodiment may thereby adjust the airflow around the vehicle body. The airflow generated by the plasma actuator 100 may be sometimes referred to as ion wind or an induced airflow. Hereinafter, an airflow generated by a single plasma actuator 100 may be referred to as an "induced airflow". In one embodiment, the plasma actuator 100 may serve as an "airflow generator".

A vehicle 1 may be, for example but not limited to, a two-box passenger car including a cabin 10 and an engine compartment 20. The cabin 10 and the engine compartment 20 may configure a body part of the vehicle body in the first example embodiment. The cabin 10 may have a space that accommodates an occupant. The cabin 10 may include, for example but not limited to, a windshield 11, A-pillars 12, front doors 13, front door glasses 14, and door mirrors 15.

The windshield 11, which is sometimes referred to as a "front window", may be provided on an upper half of a front portion of the cabin 10. The windshield 11 may be so tilted rearward with respect to a vertical direction that an upper end of the windshield 11 is positioned on vehicle rear side with respect to a lower end of the windshield 11. The windshield 11 may be so curved that a middle portion of the windshield 11 in a vehicle widthwise direction protrudes toward vehicle front side.

The A-pillars 12 may each be a pillar part that is disposed along corresponding one of left and right ends of the windshield 11.

The front doors 13 may each be a door-shaped part that seals the space in the cabin 10 from its side. The front doors 13 may each be provided on a side of a front portion of the cabin 10. The front doors 13 may each include a hinge at its front end, and may be attached to the body part of the vehicle body by means of the hinge. The front doors 13 may each be thereby allowed to swing to be open or closed when an occupant gets in or gets out of the vehicle.

The front door glasses 14 may each be a glass member that is provided in an upper portion of corresponding one of the front doors 13. The front door glasses 14 may each move upward and downward. When the front door glass 14 is closed, i.e., when the front door glass 14 has moved to an uppermost position, a front end of the front door glass 14 may be disposed along a rear portion of corresponding one of the A-pillars 12.

The door mirrors 15 may each be a side-view mirror that protrudes from an upper portion in the vicinity of a front end of corresponding one of the front doors 13 toward an outer side in the vehicle widthwise direction.

The engine compartment 20 may contain, for example but not limited to, an unillustrated engine which is a traveling power source of the vehicle. The engine compartment 20 may extend from a lower half of the front end of the cabin 10 toward the vehicle front side. The lower half of the front end of the cabin 10 may be, in other words, a region that is positioned below the lower end of the windshield 11 and corresponds to a bulkhead.

The engine compartment 20 may include, for example but not limited to, a bonnet 21, which may be sometimes referred to as an "engine hood" or an "engine lid", front fenders 22, wheel houses 23, front combination lamps 24, a front grille 25, a front bumper 26, and a cowl 27.

The bonnet 21 may be provided in an upper portion of the engine compartment 20 in an openable and closable manner. The bonnet 21 may be a door-shaped part that seals a portion containing the engine from upper side. The bonnet 21 may so have a curved surface that a middle portion of the bonnet 21 in a vehicle front-rear direction protrudes upward. The curved surface may have a curvature that is greater in the vicinity of the front end of the bonnet 21. The bonnet 21 may have ends in the vehicle widthwise direction that are each bent downward in a region outside corresponding one of ridge lines 21a to be coupled to a surface portion of corresponding one of the front fenders 22. The ridge lines 21a may each be a portion at which the protruding curved surface has a locally-greater curvature. The ridge lines 21a may each extend in the vehicle front-rear direction at corresponding one of side ends of the bonnet 21.

The front fenders 22 may each be an exterior member included in a side surface portion of the engine compartment 20. The front fenders 22 may each have a rear edge that extends along a front edge of corresponding one of the front doors 13. Provided below the respective front fenders 22 may be arc-shaped wheel arches 22a. The wheel arches 22a may each serve as an upper edge of corresponding one of the wheel houses 23 in a side-view of the vehicle 1.

The wheel houses 23 may each contain corresponding one of front wheels FW of the vehicle 1. The wheel houses 23 may each be provided on inner side of corresponding one of the wheel arches 22a, at a lower-side portion of the engine compartment 20. The wheel houses 23 may each be a space that is open outward in the vehicle widthwise direction.

The front combination lamps 24 may each include a head lamp and other lamps contained in a single housing to be unitized. The headlamp may have a lighting direction that is set to the vehicle front side. The other lamps may include, for example but not limited to, a turn signal lamp, a position lamp, and a daytime running lamp. The front combination lamps 24 may be provided in a pair. The two front combination lamps 24 may each be provided at a lower portion of the vicinity of corresponding one of left-front end and right-front end of the bonnet 21, and may be separated away from each other in the vehicle widthwise direction.

The front grille 25 may be an exterior member that is provided at an opening through which air is introduced into a component such as an unillustrated radiator core or a condenser of an air conditioner. The front grille 25 may be disposed between the right and left front combination lamps 24.

The front bumper 26 may be an exterior member included in the front end of the vehicle body, and may be provided below the front combination lamps 24 and the front grille 25.

The front bumper 26 may have right and left side ends that each extend below a front portion of corresponding one of the front fenders 22 and come into contact with a front portion of corresponding one of the wheel houses 23.

The cowl 27 may be a region provided with an unillustrated front wiper device and an airbag device directed to protection of a pedestrian. The front wiper device may wipe the windshield 11. The cowl 27 may be disposed between a rear edge of the bonnet 21 and the lower end or the front end of the windshield 11. The cowl 27 may have a tray-like shape having a depression downward with respect to the surface of the bonnet 21.

An airflow adjusting apparatus 30 described below may be provided on the bonnet 21.

Figure 2:
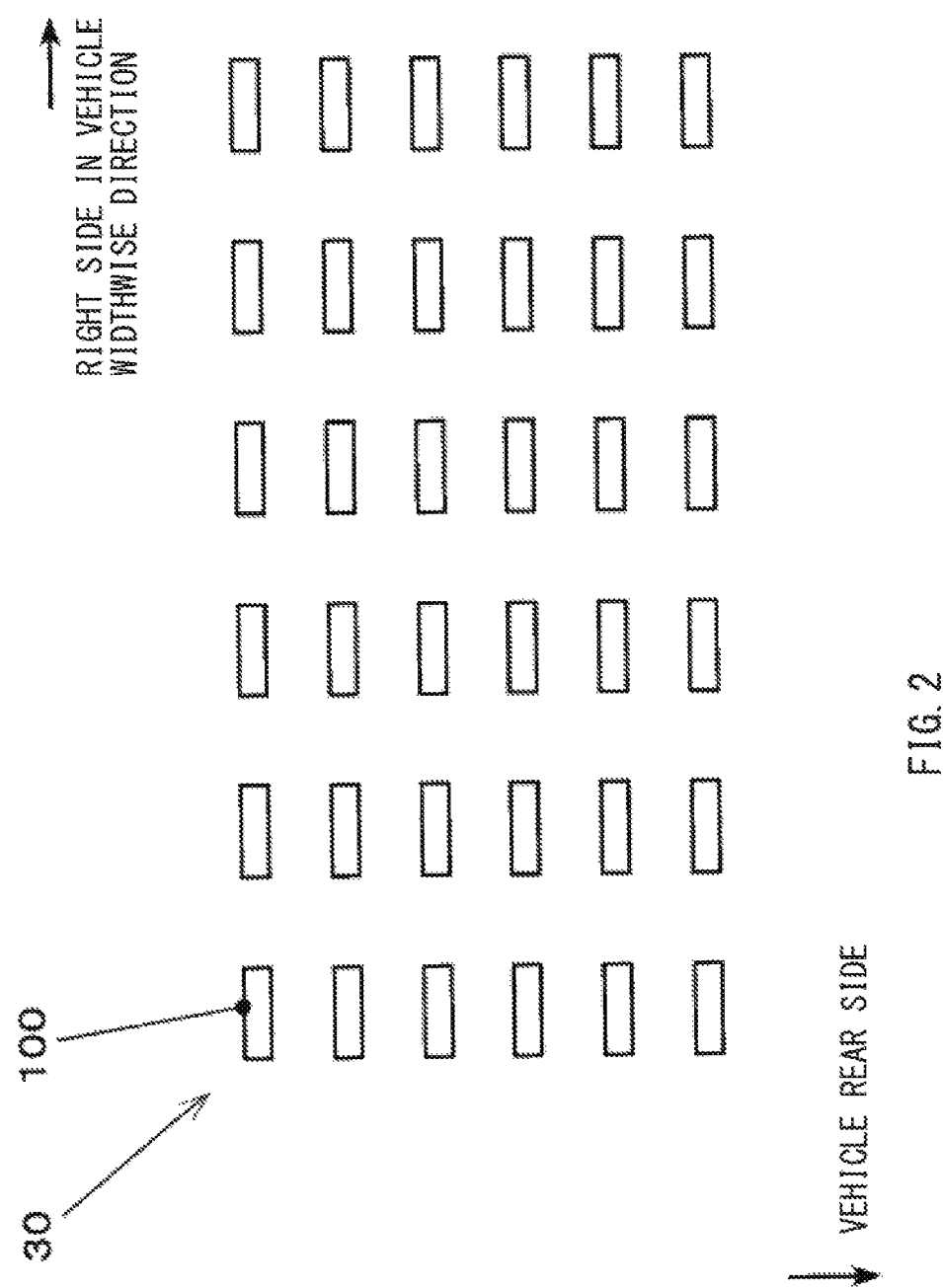
FIG. 2 is a diagram illustrating an example of arrangement of plasma actuators in the airflow adjusting apparatus.

FIG. 2 is a schematic external view of the airflow adjusting apparatus 30 according to the first example embodiment of the technology, and illustrates arrangement of the plasma actuators 100 in the airflow adjusting apparatus 30 in a state where the bonnet 21 is viewed from above the vehicle body. The airflow adjusting apparatus 30 according to the first example embodiment may include thirty-six plasma actuators 100 (in 6 lines×6 lines) in total in a grid pattern (or in a matrix) on the surface of the bonnet 21. In other words, six lines of the plasma actuators 100 may be arranged in the vehicle front-rear direction and six lines of the plasma actuators 100 may be arranged in the vehicle widthwise direction. The vehicle widthwise direction may be perpendicular to the vehicle front-rear direction. The plasma actuators 100 may each be so disposed that its main generation direction of an airflow is set toward the vehicle rear side. In one embodiment, the vehicle front-rear direction may serve as a "first direction". In one embodiment, the vehicle widthwise direction may serve as a "second direction".

Next, a configuration of a two-electrode plasma actuator 100 to be used in the airflow adjusting apparatus 30 according to the first example embodiment will be described below.

Figure 3:
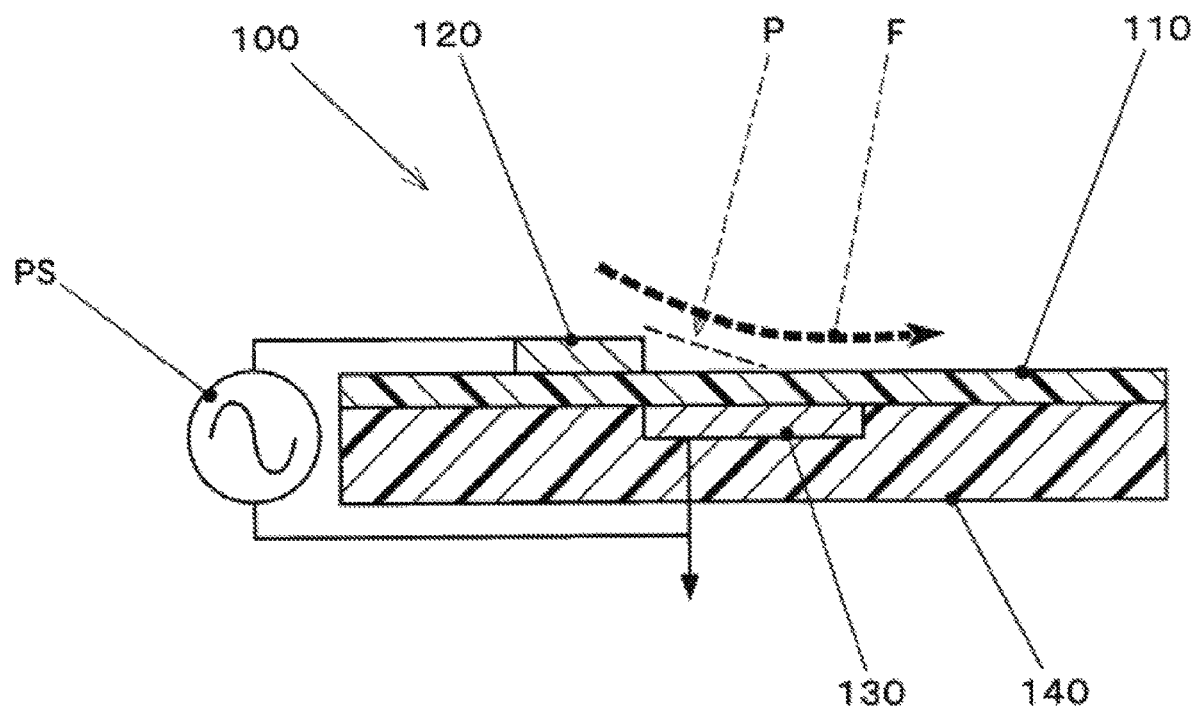
FIG. 3 is a schematic cross-sectional view of an example of a two-electrode plasma actuator to be included in the airflow adjusting apparatus.

FIG. 3 is a schematic cross-sectional view of the two-electrode plasma actuator 100 to be included in the airflow adjusting apparatus 30 according to the first example embodiment of the technology.

The two-electrode plasma actuator 100 may include, for example but not limited to, a dielectric 110, an upper electrode 120, a lower electrode 130, and an insulator 140.

The dielectric 110 may be a sheet-shaped member including a material such as fluorocarbon resin, for example. Non-limiting examples of the fluorocarbon resin may include polytetrafluoroethylene.

The upper electrode 120 and the lower electrode 130 may each include a thin-film-shaped electrically-conductive member including a material such as metal, for example. Non-limiting examples of the metal may include copper. The upper electrode 120 may be provided on an outer surface side of the dielectric 110. In the first example embodiment, the outer surface side of the dielectric 110 refers to a side that is exposed to the outside when the plasma actuator 100 is attached to the vehicle body. The lower electrode 130 may be provided on an inner surface side of the dielectric 110 that is opposite to the outer surface side of the dielectric 110. The upper electrode 120 and the lower electrode 130 may be disposed at different positions in a direction parallel to the surface of the dielectric 110.

The insulator 140 may be a sheet-shaped member serving as a base of the plasma actuator 100. The insulator 140 may be so disposed on the inner surface side of the dielectric 110 as to cover an inner surface of the dielectric 110 and the lower electrode 130.

For the upper electrode 120 and the lower electrode 130 of the plasma actuator 100, a power supply PS may be provided. The power supply PS may apply an alternating-current voltage between the upper electrode 120 and the lower electrode 130. Application, by means of the power supply PS, of an alternating-current voltage having a predetermined waveform may allow plasma P to be generated between the upper electrode 120 and the lower electrode 130. It may be necessary that the applied voltage be high enough to cause electrical breakdown to generate the plasma P. An allowable applied voltage range may be from 1 kV to 10 kV, for example. Further, a frequency range of the applied voltage may be from 1 kHz to 10 kHz, for example. The plasma P may allow air on the outer surface side of the plasma actuator 100 to be drawn in to provoke a wall-jet airflow F.

FIG. 3 illustrates a case where the plasma P provokes the airflow F that flows in a direction from the upper electrode 120 toward the lower electrode 130. However, the plasma actuator 100 may control the waveform of the applied alternating-current voltage to thereby reverse the direction of provoking the airflow F.

The airflow adjusting apparatus 30 according to the first example embodiment may include a control system described below, to supply driving electric power to the two-electrode plasma actuator 100 and thereby generate the airflow F along a surface of an object, thereby adjusting or deflecting an airflow W generated in the vicinity of the surface of the object. According to the first example embodiment, the object may be the vehicle body, and the airflow adjusting apparatus 30 may adjust or deflect the airflow W generated in the vicinity of the surface of the vehicle body, for example, the front portion of the vehicle body.

Figure 4:
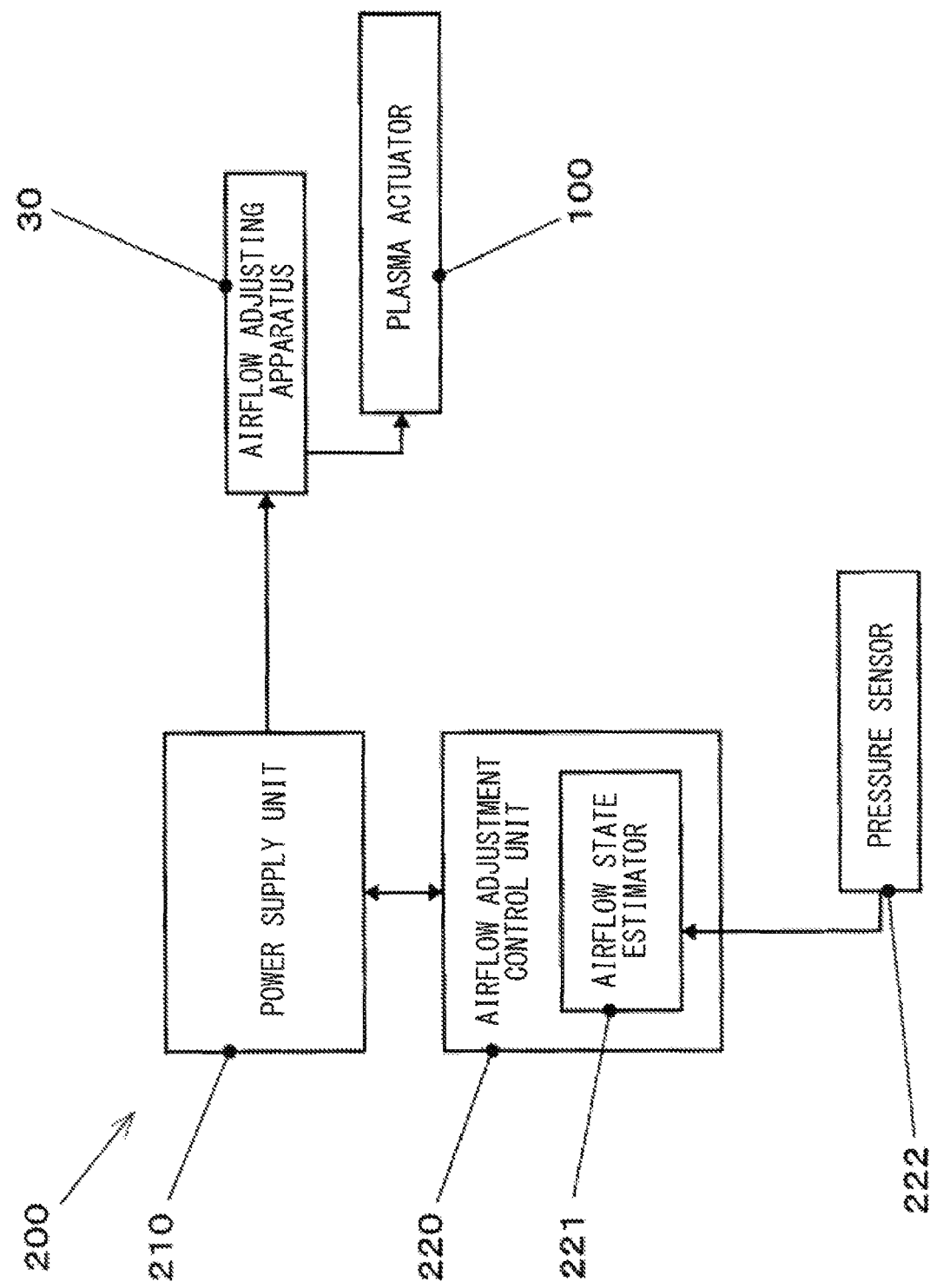
FIG. 4 is a block diagram illustrating an example of a configuration of a control system of the plasma actuator in the airflow adjusting apparatus.

FIG. 4 is a block diagram illustrating a configuration of a control system 200 of the plasma actuators 100 in the airflow adjusting apparatus 30 according to the first example embodiment of the technology. In one embodiment, the control system 200 may serve as a "controller".

The control system 200 may include a power supply unit 210 and an airflow adjustment control unit 220.

The power supply unit 210 may include the unitized power supplies PS that each independently perform supply of electric power between the upper electrode 120 and the lower electrode 130 of each of the plasma actuators 100 included in the airflow adjusting apparatus 30.

The airflow adjustment control unit 220 may give the power supply unit 210 an instruction in accordance with a state of the airflow W around the vehicle body. The airflow adjustment control unit 220 may thereby activate or deactivate the respective plasma actuators 100 independently of each other, and in a case of activating the respective plasma actuators 100, control a generation direction and intensity of each of the airflows F via the power supply unit 210.

The power supply unit 210 and the airflow adjustment control unit 220 may each include, for example but not limited to, an information processor such as a central processing unit (CPU), a storage device such as a random-access memory (RAM) or a read-only memory (ROM), and an input-output interface. Such components may be coupled to each other via a component such as a bus, which may allow such components to communicate with each other.

According to the first example embodiment, the control system 200 may include a pressure sensor 222 that detects pressure on the surface of the vehicle body as an index representing a state of a traveling wind received by the vehicle body during traveling. In one specific but non-limiting example, the pressure on the surface of the vehicle body may be pressure on the bonnet 21 derived from the traveling wind, which may be dynamic pressure. According to the first example embodiment, the airflow adjustment control unit 220 may include an airflow state estimator 221. The airflow state estimator 221 may estimate or determine a state of the traveling wind on the basis of pressure detected by the pressure sensor 222. In one specific but non-limiting example, the state of the traveling wind may include a direction and intensity of the traveling wind. In one specific but non-limiting example, the pressure sensors 222 may be arranged along the surface of the bonnet 21. For example, the pressure sensors 222 may be arranged in a grid pattern in the vehicle front-rear direction and in the vehicle widthwise direction along the surface of the bonnet 21. The airflow state estimator 221 may estimate the direction and the intensity of the traveling wind on the basis of distribution of pressure detected along the surface of the bonnet 21 by the pressure sensor 222.

Figure 5:
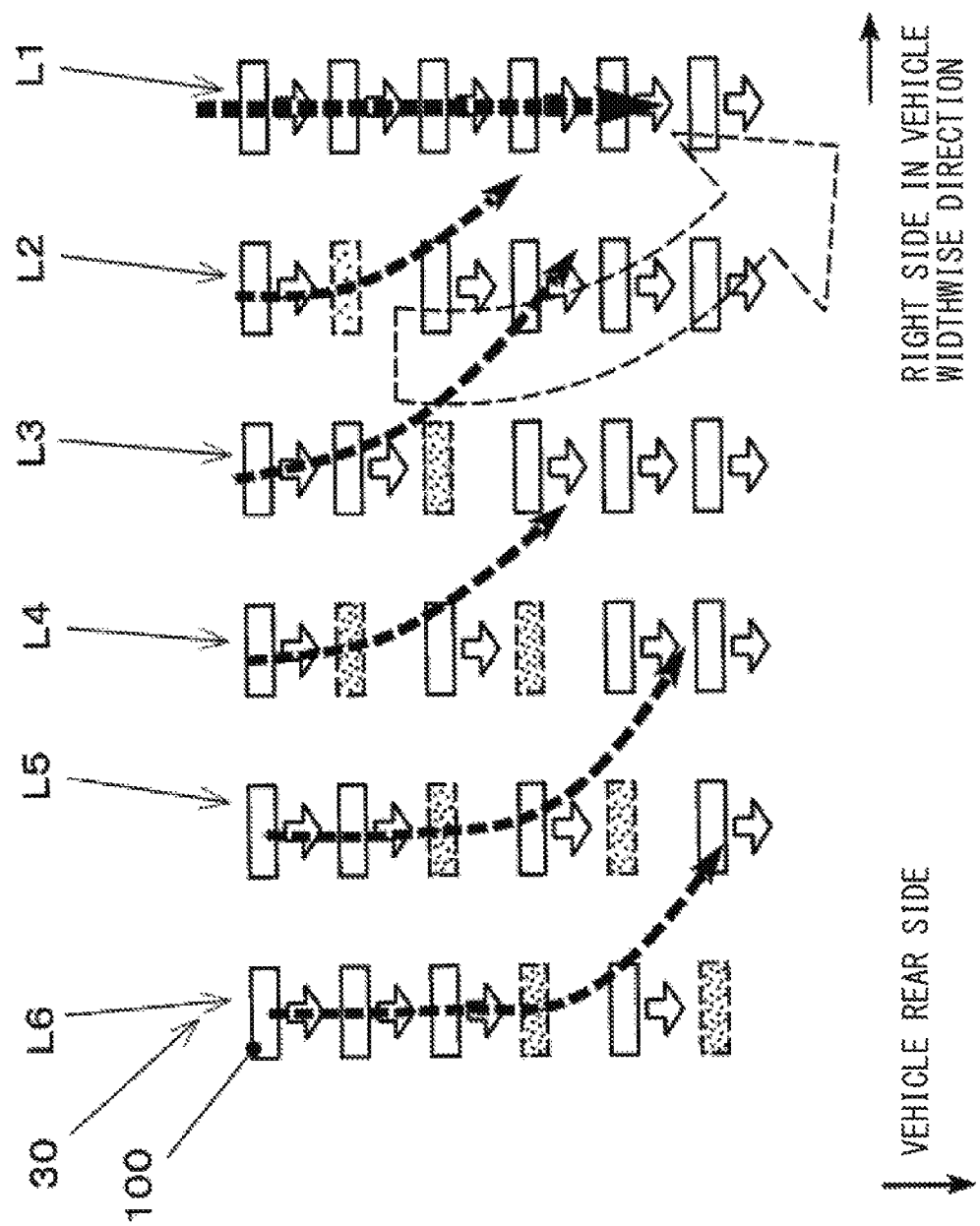
FIG. 5 is a schematic diagram illustrating an example of a principle of operation of the airflow adjusting apparatus.

Next, a principle of deflecting the airflow W according to the first example embodiment of the technology will be described below with reference to FIG. 5. FIG. 5 illustrates a principle of operation of the airflow adjusting apparatus 30 according to the first example embodiment.

In FIG. 5, lines in which the plasma actuators 100 included in the airflow adjusting apparatus 30 are arranged side by side in the vehicle front-rear direction are referred to as a first line L1, a second line L2, a third line L3, a fourth line L4, a fifth line L5, and a sixth line L6 in order from right to left in the vehicle widthwise direction. Unhatched outlines by solid lines represent activated plasma actuators 100, i.e., the plasma actuators 100 to each which a voltage is being applied by the power supply PS and that each are generating the airflow F. Hatched outlines by broken lines represent deactivated plasma actuators 100.

FIG. 5 illustrates a state where the airflow W generated around the vehicle body by the traveling wind blown from the front side against the vehicle body is deflected toward the right side in the vehicle widthwise direction.

In the example state illustrated in FIG. 5, all of the six plasma actuators 100 in the first line L1 may be activated, and may be generating airflows toward the vehicle rear side. This may accelerate an airflow passing the vicinity of the first line L1, and cause such airflow to be higher in speed than airflows in other regions.

Among the six plasma actuators 100 in the second line L2, only a second plasma actuator 100 from the front may be deactivated.

Among the six plasma actuators 100 in the third line L3, only a third plasma actuator 100 from the front may be deactivated.

This may accelerate airflows passing the vicinity of the second line L2 and the third line L3 compared with airflows that have not passed through the airflow adjusting apparatus 30 yet, while the airflows passing the vicinity of the second line L2 and the third line L3 may be still lower in speed than the airflow passing the vicinity of the first line L1. Accordingly, the airflows passing the vicinity of the second line L2 and the third line L3 may be deflected in a direction of approaching the first line L1.

Here, according to the first example embodiment, outputs from the respective activated plasma actuators 100 may be equivalent or approximately equivalent to each other. Therefore, a total output from the activated plasma actuators 100 in the first line L1 (a sum of kinetic energy applied to the airflow passing the vicinity of the first line L1) may be higher than a total output from the activated plasma actuators 100 in the second line L2 or a total output from the activated plasma actuators 100 in the third line L3.

Among the six plasma actuators 100 in the fourth line L4, second and fourth plasma actuators 100 from the front may be deactivated.

Among the six plasma actuators 100 in the fifth line L5, third and fifth plasma actuators 100 from the front may be deactivated.

Among the six plasma actuators 100 in the sixth line L6, fourth and sixth plasma actuators 100 from the front may be deactivated.

This may accelerate airflows passing the vicinity of the fourth line L4, the fifth line L5, and the sixth line L6 compared with airflows that have not passed through the airflow adjusting apparatus 30 yet, while the airflow passing the vicinity of each of the fourth line L4, the fifth line L5, and the sixth line L6 may be still lower in speed than the airflow passing the vicinity of the second line L2 or the third line L3. Accordingly, the airflows passing the vicinity of the fourth line L4, the fifth line L5, and the sixth line L6 may be deflected in a direction of approaching the second line L2 and the third line L3.

Here, the deactivated plasma actuators 100 may be arranged in an offset manner in the vehicle front-rear direction between the second line L2 and the third line L3, between the fourth line L4, the fifth line L5, and the sixth line L6, and between the second line L2 to the sixth line L6. This allows the airflows to be deflected smoothly and allows the deflected airflows to join each other smoothly.

As known, according to Euler equations, a fluid has a basic property that a high-speed flow has a low pressure while a low-speed flow has a high pressure. Accordingly, a fluid component with a lower-speed tends to join to a fluid component with a higher-speed. While Navier-Stokes equations further considers viscosity, it is not necessary to consider viscosity in the example embodiments of the technology, but the basic fluid property is simply considered. Thus, in a case where the airflows passing the vicinity of the airflow adjusting apparatus 30 have a difference in flow speed depending on their passing positions, a low-speed airflow may be drawn to a high-speed airflow Accordingly, the airflows passing the vicinity of the second line L2 to the sixth line L6 may be drawn to and join the airflow that is passing the vicinity of the first line L1 and has a highest speed. Further, the joined airflows may be deflected toward the right as a result of pressure balance in the vehicle widthwise direction. In FIG. 5, a dotted outline arrow represents a direction of the airflow W as a whole that is passing the vicinity of the airflow adjusting apparatus 30.

As described above, the airflow adjusting apparatus 30 may be configured to deflect the airflow W passing the vicinity of the airflow adjusting apparatus 30. For example, as illustrated in FIG. 1, the airflow adjusting apparatus 30 may be configured to deflect the airflow W, which is passing the vicinity of the surface of the bonnet 21, toward the outer side in the vehicle widthwise direction to thereby guide the airflow W to a side of the front fender 22. This makes it possible to suppress interference of the airflow W with the windshield 11 and the A-pillars 12. This also makes it possible to prevent the airflow W from passing through the inside of the cowl 27 to be caused to flow toward the rear side of the A-pillar 12, which prevents generation of a turbulent flow accompanied by a vortex flow on the side of the front door glass 14 and thereby allows for suppression of growth of the vortex flow.

A so-called vortex generator including a part such as a protrusion can achieve a certain effect in control of a vortex generated downstream of the vortex generator. However, the vortex generator itself can be one cause of generating resistance. In addition, it is difficult to achieve a favorable flow adjustment effect unless a limited airflow condition is satisfied. In contrast, the plasma actuator may suppress a disadvantageous increase in resistance, unlike the vortex generator. However, in general, a direction of an airflow that the plasma actuator can generate is limited to a certain direction. Therefore, it is not always possible to achieve an airflow adjustment effect favorable for a state of an airflow around the vehicle body.

As described above, the following effects are achievable according to the first example embodiment of the technology.

(1) A portion of the plasma actuators 100 arranged in the grid pattern in the airflow adjusting apparatus 30 may be deactivated to cause the airflows passing in the vicinity of the airflow adjusting apparatus 30 to have a difference in flow speed depending on their flowing positions. This causes the low-speed airflow to be drawn toward the high-speed airflow, thereby allowing the airflow W to be deflected in a direction that is appropriate in terms of airflow adjustment. As a result, it is possible to achieve favorable airflow adjustment effects.

(2) Adopting the plasma actuator 100 allows for generation of the induced airflow F with favorable responsiveness by means of a simple and robust configuration having no movable part. As a result, it is possible to stably achieve the above-described airflow adjustment effects.

(3) Arranging the plasma actuators 100 in the vehicle front-rear direction and orienting the generation directions, of the airflows F of the respective plasma actuators 100 in the first line L1 to the sixth line L6, toward the vehicle rear side allow for generation of the airflows F that flow in the vehicle front-rear direction at a relatively-high speed. As a result, it is possible to appropriately achieve the above-described airflow adjustment effect.

(4) Arranging the plasma actuators 100 in the grid pattern in both the vehicle front-rear direction and the vehicle widthwise direction makes it possible to achieve the above-described airflow adjustment effects by means of a simple structure.

(5) Providing the airflow adjusting apparatus 30 on the surface of the vehicle body, for example, on the surface of the bonnet 21 and thereby guiding the airflow W, which is passing the vicinity of the surface of the bonnet 21, toward the outer side in the vehicle widthwise direction makes it possible to suppress interference of the airflow W with the windshield 11 and the A-pillars 12. This also makes it possible to prevent the airflow W from passing through the inside of the cowling 27 to be caused to flow toward the rear side of the A-pillar 12, which prevents generation of a turbulent flow accompanied by a vortex flow on the side of the front door glass 14 and thereby allows for suppression of growth of the vortex flow.

Next, airflow adjusting apparatuses according to other example embodiments of the technology will be described.

Second Example Embodiment

Figure 6:
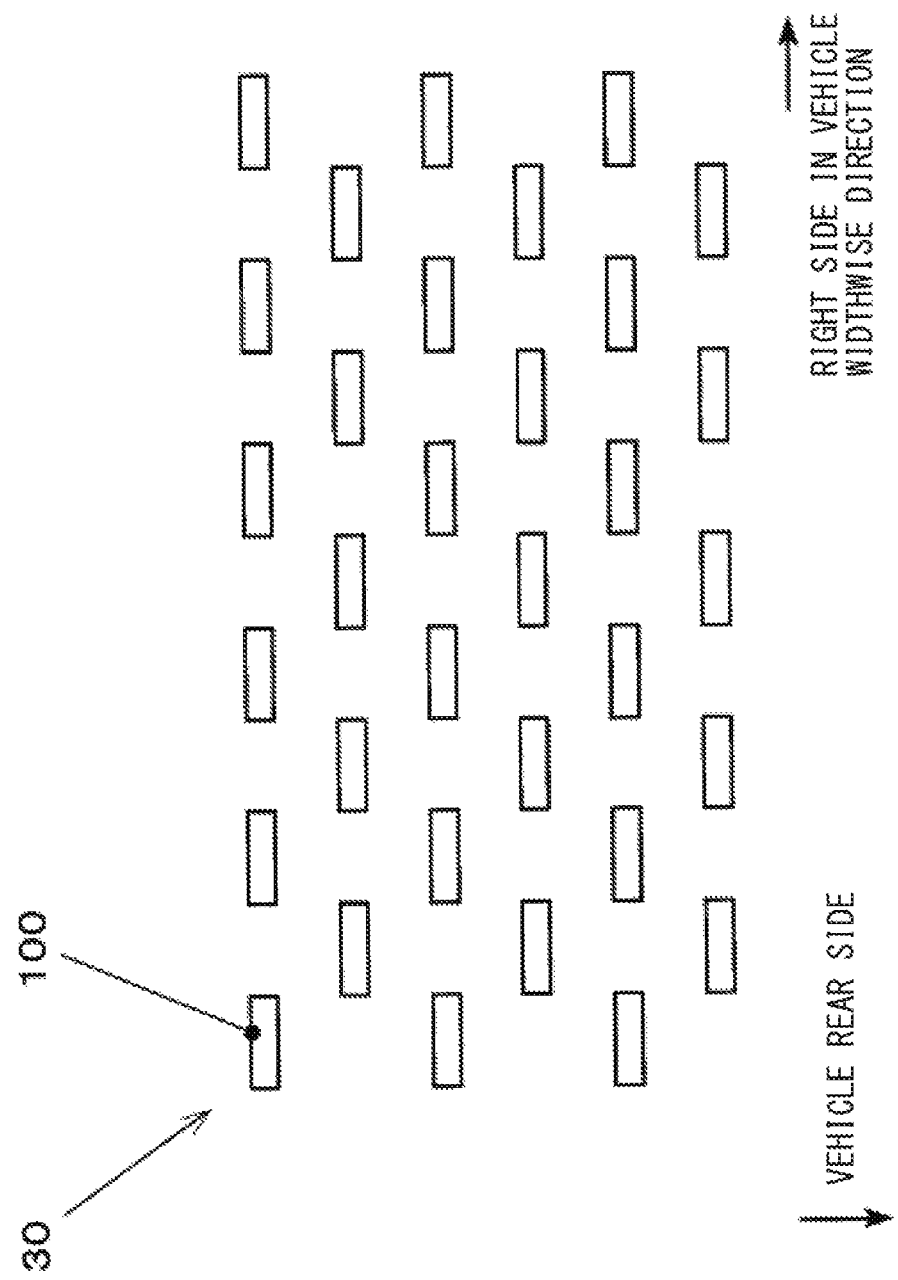
FIG. 6 is a diagram illustrating an example of arrangement of plasma actuators in an airflow adjusting apparatus according to one example embodiment of the technology.

FIG. 6 illustrates arrangement of the plasma actuators 100 in an airflow adjusting apparatus 30 according to a second example embodiment of the technology.

According to the second example embodiment, the plasma actuators 100 in even-number lines (e.g., a second line) from the vehicle front side are shifted in the vehicle widthwise direction relative to the plasma actuators 100 in odd-number lines (e.g., a first line) from the vehicle front side. According to the second example embodiment, the plasma actuators 100 may have the same or substantially the same width, and the plasma actuators 100 in the even-number lines may be offset in the vehicle widthwise direction relative to the plasma actuators 100 in the odd-number lines by a distance corresponding to their widths. This causes the plasma actuators 100 included in the airflow adjusting apparatus 30 to be arranged in a so-called zigzag pattern or in a staggered pattern, according to the second example embodiment.

According to the second example embodiment, it is also possible to achieve airflow adjustment effects similar to those of the first example embodiment.

Third Example Embodiment

Figure 7:
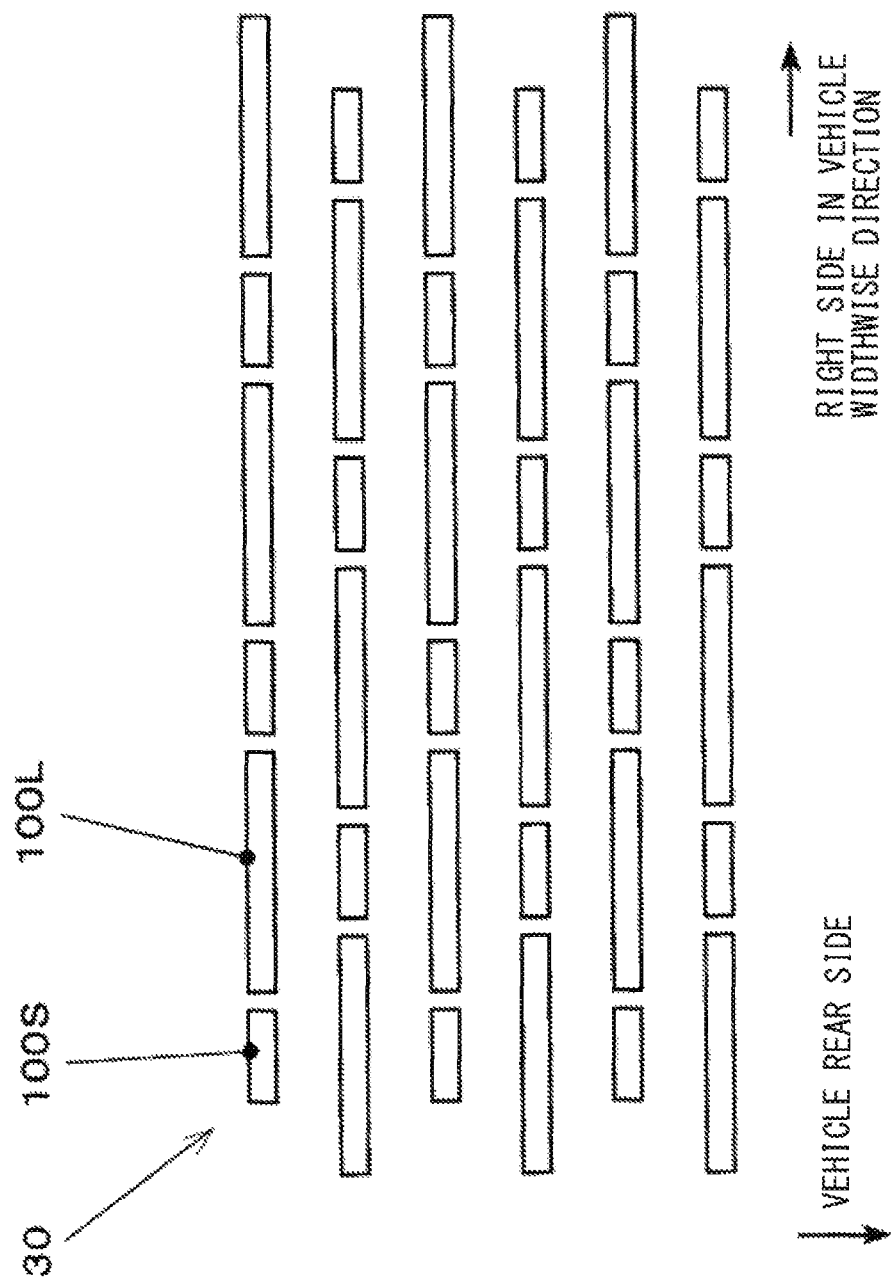
FIG. 7 is a diagram illustrating an example of arrangement of plasma actuators in an airflow adjusting apparatus according to one example embodiment of the technology.

FIG. 7 illustrates arrangement of plasma actuators 100S and 100L in an airflow adjusting apparatus 30 according to a third example embodiment of the technology.

According to the third example embodiment, the plasma actuator 100S and the plasma actuators 100L may be adopted as the plasma actuators 100. The plasma actuators 100S may each have a relatively-short dimension in a direction perpendicular to the generation direction of the airflow F (i.e., in a longitudinal direction) in a plan view. The dimension in the direction perpendicular to the generation direction of the airflow F is hereinafter sometimes referred to as an "airflow generation width". The plasma actuators 100L may each have a relatively-long airflow generation width. The plasma actuators 100S and the plasma actuators 100L may be alternately arranged along the surface of the vehicle body, for example, the surface of the bonnet 21, in both the vehicle front-rear direction and the vehicle widthwise direction. In other words, the plasma actuators 100S and the plasma actuators 100L may be arranged alternately (or in a staggered pattern) in the vehicle front-rear direction, and the plasma actuators 100S and the plasma actuators 100L may be arranged alternately in the vehicle widthwise direction as well. In addition, the plasma actuators 100 arranged in the odd-number lines from the vehicle front side may be offset in the vehicle widthwise direction relative to the plasma actuators 100 arranged in the even-number lines from the vehicle front side. Accordingly, the plasma actuator 100S in a certain line may be arranged in front of the plasma actuator 100L in a subsequent line immediately on the rear side of the certain line, and the plasma actuator 100L in the certain line may be arranged in front of the plasma actuator 100S in the subsequent line immediately on the rear side of the certain line.

According to the third example embodiment, arrangement including a combination of the plasma actuators 100S each having the relatively-short width and the plasma actuators 100L each having the relatively-long width in the staggered pattern allows the airflows passing the vicinity of the airflow adjusting apparatus 30 to provide more-complex distribution of flow speeds. This makes it possible to not only achieve airflow adjustment effects similar to those of the first example embodiment but makes it possible to more appropriately deflect the airflow W. For example, the plasma actuator 100S having the shorter width and the plasma actuator 100L having the longer width may overlap with each other in a flow direction of an airflow at some points and the plasma actuator 100S having the shorter width and the plasma actuator 100L having the longer width may not overlap with each other in the flow direction of the airflow at other points. At the overlapping points, a flow speed may be locally increased to enhance an effect of drawing airflows around the points. On the other hand, at the non-overlapping points, an increase in the flow speed may be suppressed to further increase a difference in flow speed between the overlapping positions and the non-overlapping positions. This makes it possible to deflect the airflow W more strongly.

Fourth Example Embodiment

An airflow adjusting apparatus 30 according to a fourth example embodiment may adopt a three-electrode plasma actuator 100A described below, instead of the two-electrode plasma actuator 100.

Figure 8:
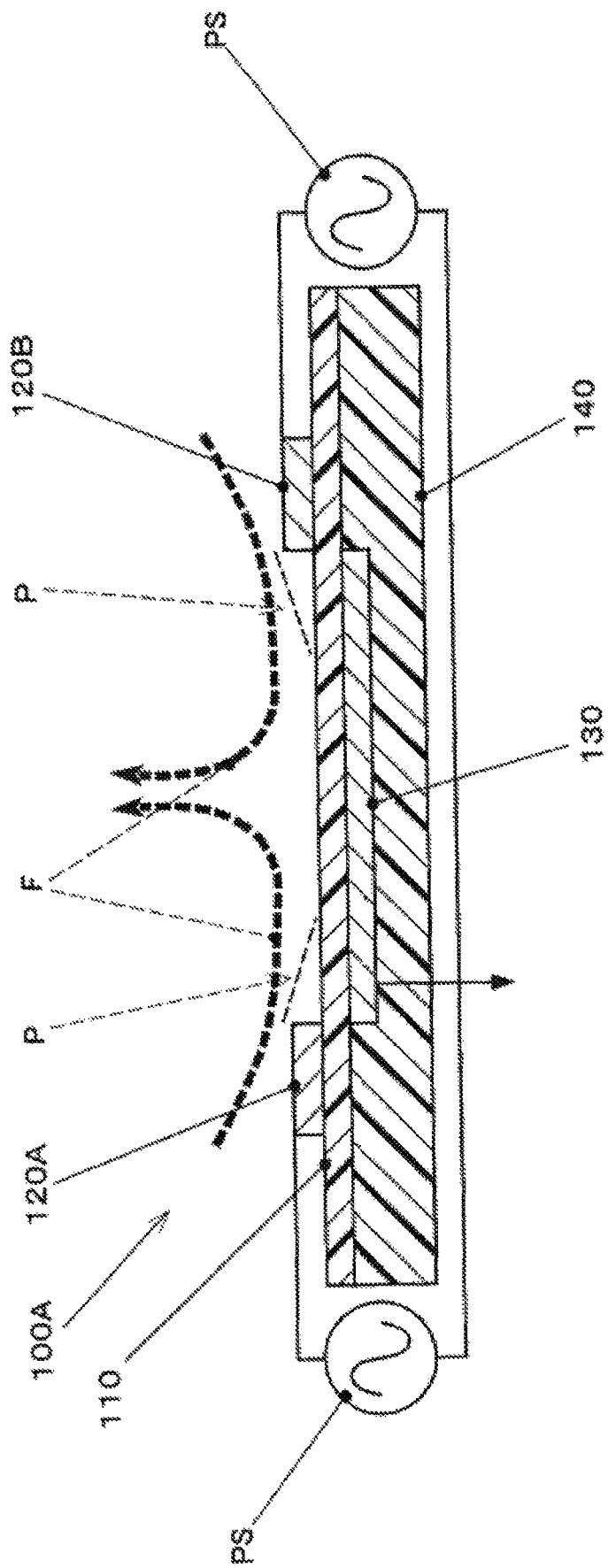
FIG. 8 is a schematic cross-sectional view of an example of a three-electrode plasma actuator to be included in an airflow adjusting apparatus according to one example embodiment of the technology.

FIG. 8 is a schematic cross-sectional view of the three-electrode plasma actuator 100A to be included in the airflow adjusting apparatus 30 according to the fourth example embodiment.

The three-electrode plasma actuator 100A may include a pair of upper electrodes 120, i.e., an upper electrode 120A and an upper electrode 120B, and power supplies PS. The upper electrodes 120A and 102B may each be provided on an outer surface side of the dielectric 110. Such upper electrodes 120A and 120B may be so disposed on both sides of the lower electrode 130 that the upper electrodes 120A and 120B are symmetrical with respect to the lower electrode 130. The power supplies PS may be configured to apply voltages to the respective upper electrodes 120A and 120B independently of each other.

Such a three-electrode plasma actuator 100A may be configured to generate plasma P between the upper electrode 120A and the lower electrode 130 and generate plasma P between the upper electrode 120B and the lower electrode 130, and to generate the airflows F that oppose each other with the use of the generated plasma P. The opposing airflows F may be caused to crash each other and join each other, thereby generating an airflow in a direction away from a principal plane of the plasma actuator 100A, for example, in a direction of a normal to the outer surface of the dielectric 110.

Further, the three-electrode plasma actuator 100A may be configured to generate an airflow that flows in a direction having an acute angle with respect to the principal plane of the plasma actuator 100A by causing an output from one plasma discharger (e.g., the discharger including the upper electrode 120A) to be greater than an output from the other plasma discharger (e.g., the discharger including the upper electrode 120B). Further, the three-electrode plasma actuator 100A may also be configured to generate an airflow that flows along the principal plane of the plasma actuator 100A by applying a voltage only to the upper electrode 120 in one of the plasma dischargers (e.g., the upper electrode 120A), as with the two-electrode plasma actuator 100. Further, the three-electrode plasma actuator 100A may also be configured to vary the flow direction of the joined airflows by controlling a factor such as the voltages applied to the respective upper electrodes 120A and 120B.

According to the fourth example embodiment, a speed vector having a component in a direction away from the surface of the vehicle body, for example, the surface of the bonnet 21, may be provided to the airflow generated by the airflow adjusting apparatus 30, thereby allowing the airflow W to flow upward from the surface of the bonnet 21. This allows the airflow W to be guided in a more appropriate direction. As a result, it is possible to achieve more favorable airflow adjustment effects.

According to the airflow adjusting apparatus of an embodiment of the technology, airflow generators are so controlled that adjacent groups of the airflow generators have different total outputs from each other to guide an airflow in the vicinity of a surface of an object in an appropriate direction along the surface, making it possible to achieve a favorable flow adjustment effect.

Modifications

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configurations of the airflow adjusting apparatus and the vehicle are not limited to those described in the example embodiments above, and may be appropriately changed. For example, a shape of the vehicle and an installation position of the airflow adjusting apparatus may be appropriately changed. For example, the installation position of the airflow adjusting apparatus according to an embodiment of the technology is not limited to the bonnet. For example, the airflow adjusting apparatus according to an embodiment of the technology may be provided on any other portion of the vehicle, such as a roof, a fender, a door panel, a tailgate, a trunk lid, a floor under panel, or a bumper face bar. Moreover, the airflow adjusting apparatus may be provided on a window of a cabin, such as a front window, a rear window, a side-door window, or a rear-quarter window, as long as a field of view is secured.

(2) The number and the arrangement of the plasma actuators included in the airflow adjusting apparatus are not limited to those in the above-described example embodiments, and may be appropriately changed. Moreover, the plasma actuator 100 selected to be deactivated when deflecting the airflow W and an arrangement pattern of the selected plasma actuators 100 are not particularly limited.

(3) According to the first example embodiment, etc., the pressure sensor 222 may be adopted and the airflow adjusting apparatus 30 may be controlled on the basis of distribution of pressure detected in the vicinity of the surface of the bonnet 21. However, this is non-limiting. For example, behavior of the airflow may be detected directly by means of a device such as a Doppler laser to thereby control the airflow adjusting apparatus 30 in accordance with the detected behavior of the airflow. Further, airflows around the vehicle body or in the vicinity of the surface of the bonnet 21 at respective vehicle speeds may be obtained in advance by means of a wind-tunnel experiment or a numerical analysis to thereby change a direction of the airflow deflected by the airflow adjusting apparatus 30 in accordance with an actual vehicle speed.

(4) According to the first example embodiment, etc., the number of activated plasma actuators 100 may be made different between the plasma actuators 100 in the first line L1 and the plasma actuators 100 in the second line L2, to thereby generate a difference in flow speed between the airflows. However, this is non-limiting and any other method may be used to generate the difference in flow speed. For example, a total output from airflow generators (plasma actuators) included in a first group may be made different from a total output from airflow generators (plasma actuators) included in a second group that is adjacent to the first group, by suppressing respective outputs from the airflow generators (plasma actuators) instead of deactivating some airflow generators (plasma actuators).

As described above, according to the example embodiments of the technology, causing the total output from the airflow generators in the first group to be greater than the total output from the airflow generators in the second group allows a flow speed of an airflow generated along the airflow generators in the first group to be higher than a flow speed of an airflow generated along the airflow generators included in the second group. The second group is adjacent to the first group. Here, a fluid, such as air has a property that a flow having a lower flow speed is drawn toward a flow having a higher flow speed. Therefore, the flow having the lower flow speed may be drawn toward the flow having the higher flow speed to be deflected. The flow having the lower flow speed may be combined with the flow having the higher flow speed. Further, the combined flows may be deflected as well. As described above, appropriately switching magnitudes of total outputs from the airflow generators in the respective groups allows an airflow to be deflected in different states in the vicinity of the surface of the object. As a result, it is possible to appropriately control airflows around an object which serves as an airflow adjustment target.

Each of the power supply unit 210 (e.g., a driving circuit in the power supply unit 210) and the airflow adjustment control unit 220 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the power supply unit 210 (e.g., the driving circuit in the power supply unit 210) and the airflow adjustment control unit 220 illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the power supply unit 210 (e.g., the driving circuit in the power supply unit 210) and the airflow adjustment control unit 220 illustrated in FIG. 4.

The invention claimed is:

1. An airflow adjusting apparatus for a vehicle, the airflow adjusting apparatus comprising:
    plasma actuators that are arranged in a vehicle front-rear direction of the vehicle and a vehicle widthwise direction of the vehicle along a surface of a bonnet of the vehicle, the plasma actuators being configured to generate respective airflows in directions parallel to each other toward a vehicle rear side of the vehicle; and
    a controller configured to control outputs from the respective plasma actuators independently of each other,
    wherein the plasma actuators are comprising:
        first plasma actuators arranged in line along the vehicle front-rear direction, the first plasma actuators being located apart form a center of the bonnet in the vehicle widthwise direction; and
        second plasma actuators arranged in line along the vehicle front-rear direction, the second plasma actuators being located adjacent to the first plasma actuators in the vehicle widthwise direction and closer to the center of the bonnet in the vehicle widthwise direction than the first plasma actuators, and
    wherein the controller is configured to cause a total output from the first plasma actuators to be greater than a total output of the second plasma actuators.

2. The airflow adjusting apparatus according to claim 1, wherein the plasma actuators are arranged in a grid pattern,
    the first plasma actuators constitute a first line located most outside of the grid pattern in the vehicle widthwise direction,
    the second plasma actuators constitute a second line adjacent to the first line of the grid pattern, and
    the controller causes the total output from the first plasma actuators to be greater than the total output of the second plasma actuators by activating a larger number of the first plasma actuators than a number of the second plasma actuators to be activated.

3. The airflow adjusting apparatus according to claim 2, wherein the plasma actuators comprise third plasma actuators arranged in line along the vehicle front-rear direction,
    the third plasma actuators constitute a third line of the grid pattern, the third line being located opposite to the first line with respect to the second line in the vehicle widthwise direction, and
    the controller causes a total output from the third plasma actuators to be lower than the total output of the second plasma actuators by activating a smaller number of the third plasma actuators than the number of the second plasma actuators to be activated.

4. An airflow adjusting apparatus for a vehicle, the airflow adjusting apparatus comprising:
    two or more plasma actuators that are arranged in a grid pattern or in a zigzag pattern along a surface of a bonnet of the vehicle, the plasma actuators being configured to induce respective airflows in directions parallel to each other toward a vehicle rear side of the vehicle; and
    a controller configured to control outputs from the plasma actuators on a group basis, the group including the plasma actuators arranged side by side in a direction in which the airflows are induced, the controller including circuitry, the circuitry being configured to generate a control instruction for the plasma actuators, the control instruction causing a total output from the plasma actuators in a first group to be greater than a total output from the plasma actuators in a second group, the second group being closer to a center of the vehicle in a vehicle widthwise direction than the first group and adjacent to the first group in the vehicle widthwise direction.

* * * * *